UNITED STATES PATENT OFFICE.

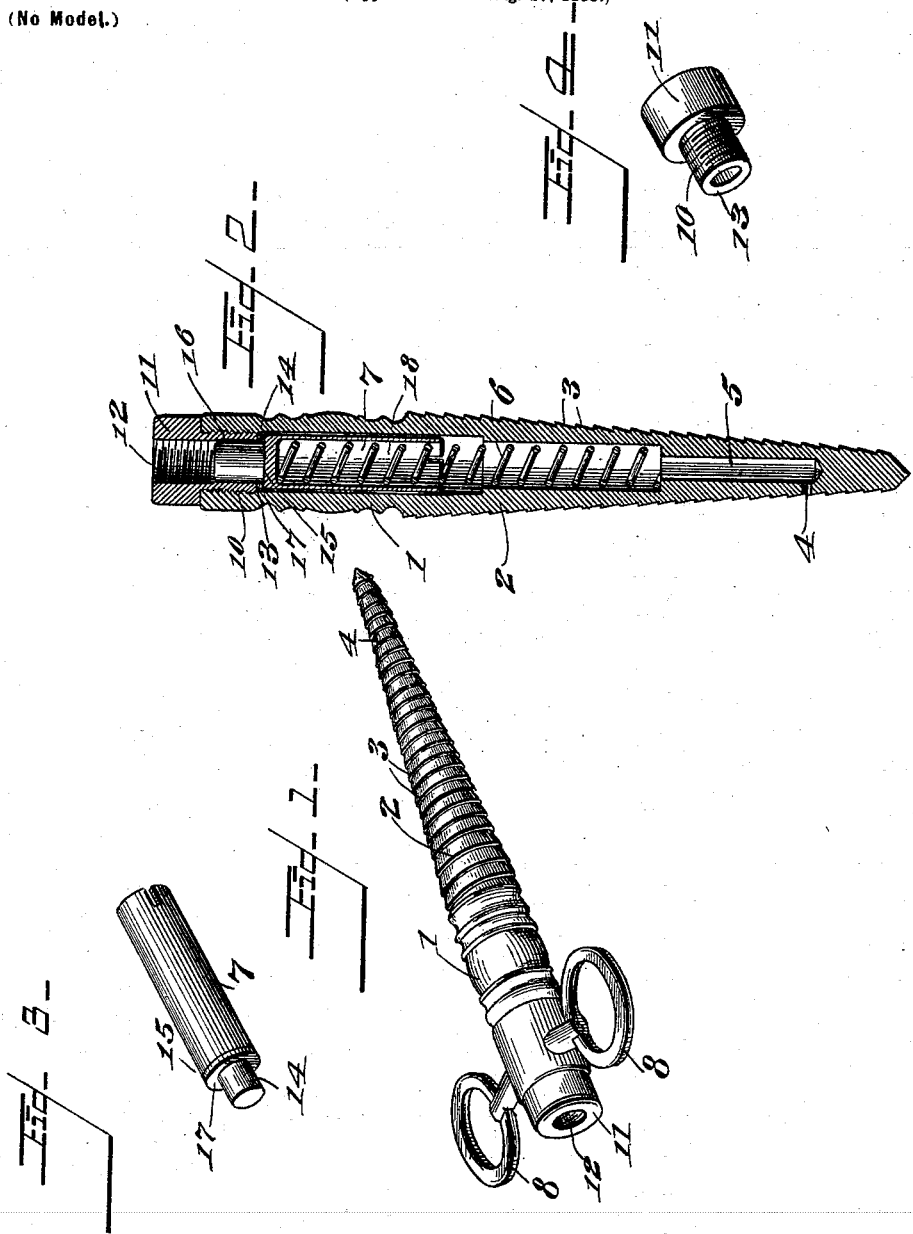

FRANK PRESTON, OF ELGIN, ILLINOIS.

COMBINED CORKSCREW AND VALVE FOR BEER-PUMPS.

SPECIFICATION forming part of Letters Patent No. 637,826, dated November 28, 1899.

Application filed August 17, 1899. Serial No. 727,566. (No model.)

*To all whom it may concern:*

Be it known that I, FRANK PRESTON, a citizen of the United States, residing at Elgin, in the county of Kane and State of Illinois, have invented a new and useful Combined Corkscrew and Valve for Beer-Pumps, of which the following is a specification.

The invention relates to a combined corkscrew and valve for beer-pumps.

The object of the present invention is to improve the construction of beer-pumps and to provide a simple, inexpensive, and efficient device designed more especially for use at picnics and for private use and adapted to serve as a corkscrew and capable of enabling the proper pressure to be maintained on a keg or other receptacle of beer or other liquid to maintain the same in a fresh condition until it is entirely consumed.

A further object of the invention is to provide a device of this character adapted to be readily carried in the pocket and capable of being quickly applied to a receptacle.

The invention consists in the construction and novel combination and arrangement of parts hereinafter fully described, illustrated in the accompanying drawings, and pointed out in the claims.

In the drawings, Figure 1 is a perspective view of a combined corkscrew and valve constructed in accordance with this invention. Fig. 2 is a longitudinal sectional view of the same. Fig. 3 is a detail perspective view of the valve. Fig. 4 is a similar view of the nipple.

Like numerals of reference indicate like and corresponding parts in the several views.

1 designates a corkscrew having a tapering body 2, provided with exterior screw-threads 3 and adapted to be readily screwed into a cork or stopper for extracting the same and also to arrange a vent 4 within the receptacle, for a purpose hereinafter described. The tapering body is hollow to provide a barrel or casing, and the vent or aperture 4 communicates with the longitudinal bore or opening 5, in which is arranged a coiled spring 6 and the valve 7, and the outer end of the body of the corkscrew is provided with a handle 8, consisting of laterally-extending arms enlarged, as shown, to form rings and adapted to be readily grasped by the operator. The outer end of the longitudinal bore or opening is interiorly threaded at 9 to receive the reduced threaded portion 10 of a nipple 11, which is interiorly threaded at 12 for the reception of an ordinary bicycle-pump, whereby the desired air-pressure within a beer-keg or other receptacle may be maintained to preserve the liquid in a fresh condition until it is entirely consumed. The inner end of the nipple forms a valve-seat 13, and the valve 7 has its outer portion 14 reduced to fit into the bore or opening of the nipple and also to provide a shoulder 15 to seat against the inner end of the said nipple. The reduced outer portion of the valve 7 is guided in the inner portion 16 of the opening or bore of the nipple, and the said inner portion 16 is smooth.

The valve is provided with a gasket 17, of rubber or other suitable material, arranged on the reduced portion 14, fitting against the shoulder 15 and adapted to be compressed against the valve-seat, whereby a perfectly air-tight connection is provided when the valve is closed.

In order to lighten the valve, it is bored from its inner end, and the socket 18 thus provided receives the outer portion of the coiled spring and forms a bearing for the same.

When pressure is applied to the outer end of the valve by the operation of an ordinary bicycle-pump, (not shown,) the valve opens and air is admitted to the interior of the receptacle, and as soon as the valve is relieved of such exterior pressure it closes on the seat automatically by the action of the spring, which is compressed by the opening of the valve.

The invention has the following advantages: The device will be simple and comparatively inexpensive in construction, possesses great strength and durability, it is adapted to be readily carried about, and is capable of being quickly applied to a keg or other receptacle to form a valve for a beer-pump. It is also adapted to be used as a corkscrew for extracting corks and stoppers, and it operates in connection with ordinary bicycle-pumps, which will enable the desired air-pressure to be maintained on a keg of beer or other liquid, so that the same will be preserved in a fresh condition until it is entirely consumed.

The device is designed especially for picnic and similar use and may also be employed to an advantage in ordinary private household use.

Changes in the form, proportion, and the minor details of construction may be resorted to without departing from the spirit or sacrificing any of the advantages of this invention.

Having thus described the invention, what is claimed as new, and desired to be secured by Letters Patent, is—

1. A device of the class described, comprising a corkscrew having a hollow body, a nipple arranged within the outer end of the bore or opening of the body and forming a valve-seat and adapted to receive a pump, a valve arranged within and adapted to reciprocate longitudinally of the body and engage the said seat, and a coiled spring also housed within the body and holding the valve against the seat, substantially as described.

2. A device of the class described comprising a corkscrew having a tubular or hollow body, a nipple fitting within the outer end of the bore or opening of the body, adapted to receive a bicycle-pump and forming an interior valve-seat, a reciprocating valve adapted to engage the seat and composed of a smooth outer portion guided in the nipple, and a tubular inner portion forming a socket, and a coiled spring housed within the body of the corkscrew and having one end fitting in the tubular portion of the valve, substantially as described.

3. A device of the class described, comprising a corkscrew having a tubular body provided at the inner end of its bore or opening with an aperture, and having the outer end interiorly threaded, a nipple having a reduced exteriorly-threaded portion to fit the said screw-thread and forming a valve-seat, said nipple being provided with a bore having a smooth inner portion and threaded outer portion, the outer portion being adapted to receive a bicycle-pump, a valve having a reduced outer portion fitting in the smooth portion of the bore of the nipple and forming a shoulder, said valve having its inner portion bored out to form a socket, and a coiled spring arranged within the body of the corkscrew and having its outer end fitting in the socket of the valve, substantially as described.

In testimony that I claim the foregoing as my own I have hereto affixed my signature in the presence of two witnesses.

FRANK PRESTON.

Witnesses:
GUSTOF L. HANSEN,
CHARLES EVANS.